(12) United States Patent
Touchette et al.

(10) Patent No.: US 6,336,598 B1
(45) Date of Patent: Jan. 8, 2002

(54) GASEOUS AND LIQUID FUEL INJECTOR WITH A TWO WAY HYDRAULIC FLUID CONTROL VALVE

(75) Inventors: Alain M. J. Touchette; Bradley D. Douville, both of Vancouver; S. Michael Baker, Delta, all of (CA); Lester L. Peters, Columbus, IN (US); Julius Perr, Columbus, IN (US); A. S. Ghuman, Columbus, IN (US); Donald J. Benson, Columbus, IN (US)

(73) Assignee: Westport Research Inc., Vancouver (CA)

( * ) Notice: Subject to any disclaimer, the term of this patent is extended or adjusted under 35 U.S.C. 154(b) by 0 days.

(21) Appl. No.: 09/552,480

(22) Filed: Apr. 18, 2000

Related U.S. Application Data

(63) Continuation-in-part of application No. 09/154,103, filed on Sep. 16, 1998, now Pat. No. 6,073,862.

(51) Int. Cl.$^7$ ............................................. R05B 1/12
(52) U.S. Cl. ....................................... 239/408; 409/410
(58) Field of Search ......................... 239/96, 408, 409, 239/410; 123/27 GE, 526, 299, 300

(56) References Cited

U.S. PATENT DOCUMENTS

| | | | |
|---|---|---|---|
| 2,173,813 A | 9/1939 | Bischof | 123/139 |
| 2,696,807 A | 12/1954 | Junge et al. | 123/27 |
| 3,747,857 A | 7/1973 | Fenne | 239/90 |

(List continued on next page.)

FOREIGN PATENT DOCUMENTS

| | | |
|---|---|---|
| DE | 1284687 | 12/1968 |
| DE | 19629107 | 1/1998 |
| EP | 0520659 | 12/1992 |

(List continued on next page.)

OTHER PUBLICATIONS

Miyake et al, "The development of high output, highly efficient gas burning diesel engines", 15th CIMAC Conference (Paris) Proceedings, vol. A2, pp. 1193–1216 (1983).

(List continued on next page.)

*Primary Examiner*—David A. Scherbel
*Assistant Examiner*—Davis Hwu
(74) *Attorney, Agent, or Firm*—McAndrews, Held & Malloy, Ltd.

(57) ABSTRACT

A hydraulically actuated dual fuel injector separately injects two fuels into a combustion chamber of an internal combustion engine. In particular, the two fuels may be controlled quantities of a first liquid fuel and a second gaseous fuel that are used to fuel a diesel engine. The injector preferably begins injecting the first fuel sequentially before beginning to inject the second fuel. The dual fuel injector comprises: (a) an injector body; (b) a hydraulic fluid inlet port formed in the injector body for enabling pressurized hydraulic fluid from a hydraulic fluid source to be introduced into the interior of the injector body, said hydraulic fluid being of sufficient pressure to maintain sealing and to prevent leakage of the gaseous fuel into the hydraulic fluid; (c) a first fuel inlet port formed in the injector body for enabling a first fuel to be introduced into the interior of the injector body; (d) a first injection valve disposed within the injector body fluidly connected to the first fuel inlet port for controlling injection of the first fuel from the injector through a first fuel ejection port; (e) a second inlet port formed in the injector body for enabling a second fuel to be introduced into the interior of the injector body; (f) a second injection valve disposed within the injector body fluidly connected to the second inlet port for controlling injection of the second fuel from the injector through a second fuel ejection port; (g) a first two-way control valve which controls the flow of the hydraulic fluid to actuate the first injection valve; (h) a second control valve which controls the flow of the hydraulic fluid to actuate the second injection valve; (i) a metering device within the injector body for metering the amount of first fuel injected by the first injection valve; and (j) a seal in the injector body which prevents leakage of the second fuel within the injector body.

29 Claims, 7 Drawing Sheets

U.S. PATENT DOCUMENTS

| | | | | |
|---|---|---|---|---|
| 4,033,301 A | | 7/1977 | Walton | 123/32 |
| 4,187,825 A | | 2/1980 | Lloyd, Jr. | |
| 4,288,980 A | * | 9/1981 | Ernst | 60/39.23 |
| 4,416,229 A | | 11/1983 | Wood | 123/304 |
| 4,543,930 A | | 10/1985 | Baker | 123/299 |
| 4,691,674 A | | 9/1987 | Otsuka et al. | 123/299 |
| 4,693,227 A | | 9/1987 | Satou | 123/575 |
| 4,711,209 A | | 12/1987 | Henkel | 123/300 |
| 4,736,712 A | | 4/1988 | Kelgard | 123/113 |
| 4,856,713 A | | 8/1989 | Burnett | 239/113 |
| 4,865,001 A | * | 9/1989 | Jensen | 123/525 |
| 4,893,604 A | * | 1/1990 | West | 123/543 |
| 4,958,605 A | | 9/1990 | O'Neal et al. | 123/300 |
| 5,060,610 A | | 10/1991 | Paro | 123/300 |
| 5,067,467 A | | 11/1991 | Hill et al. | 123/497 |
| 5,136,986 A | * | 8/1992 | Jensen | 123/27 GE |
| 5,199,398 A | | 4/1993 | Nylund | 123/299 |
| 5,315,973 A | | 5/1994 | Hill et al. | 123/304 |
| 5,365,902 A | | 11/1994 | Hsu | 123/299 |
| 5,526,786 A | * | 6/1996 | Beck et al. | 123/357 |
| 6,073,862 A | * | 6/2000 | Touchette et al. | 239/408 |

FOREIGN PATENT DOCUMENTS

| | | |
|---|---|---|
| EP | 0718489 | 6/1996 |
| EP | 0778410 | 6/1997 |
| EP | 0787900 | 8/1997 |
| GB | 603024 | 6/1948 |

OTHER PUBLICATIONS

Miyake et al., "Recent Developments of Gas Injection Diesel Engines", CIMAC Conference (Warsaw) (1987).

Fukada et al., "Development of the Highly Efficient Gas Injection Diesel Engine with Glow Plug Ignition Assist for Cogeneration Systems", JSME–ASME International Conference in Power Engineering, ICOPE–93 (1993).

Biwa, "Development of the 28/32 Gas Injection Engine", MAN B&W (undated).

* cited by examiner

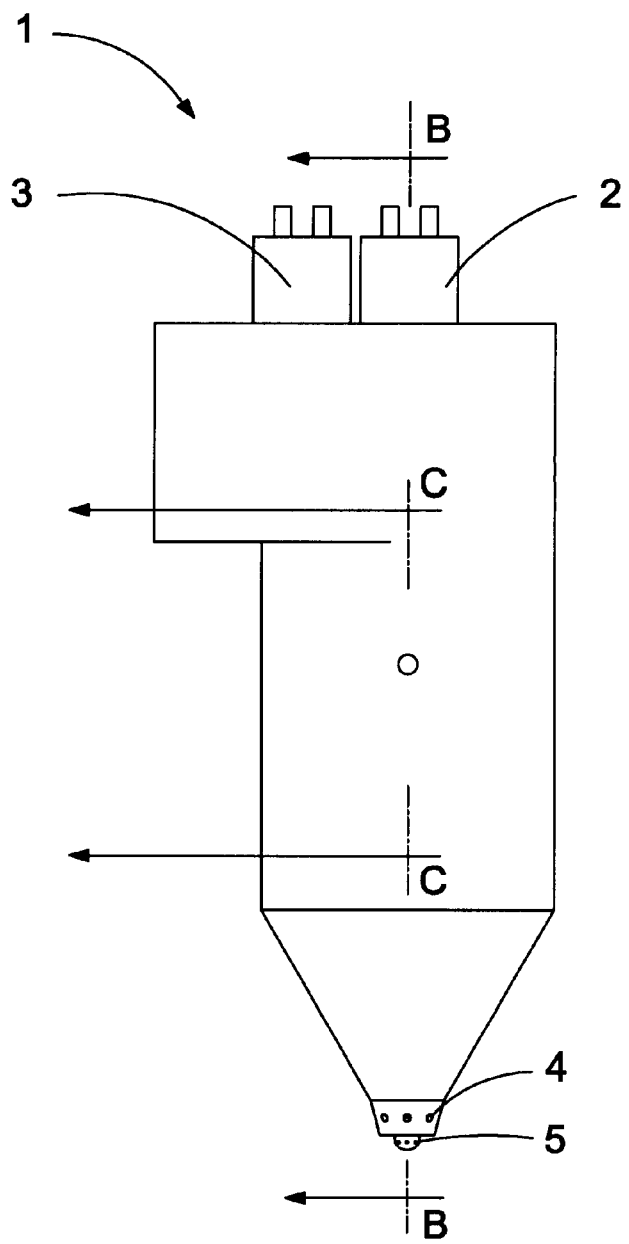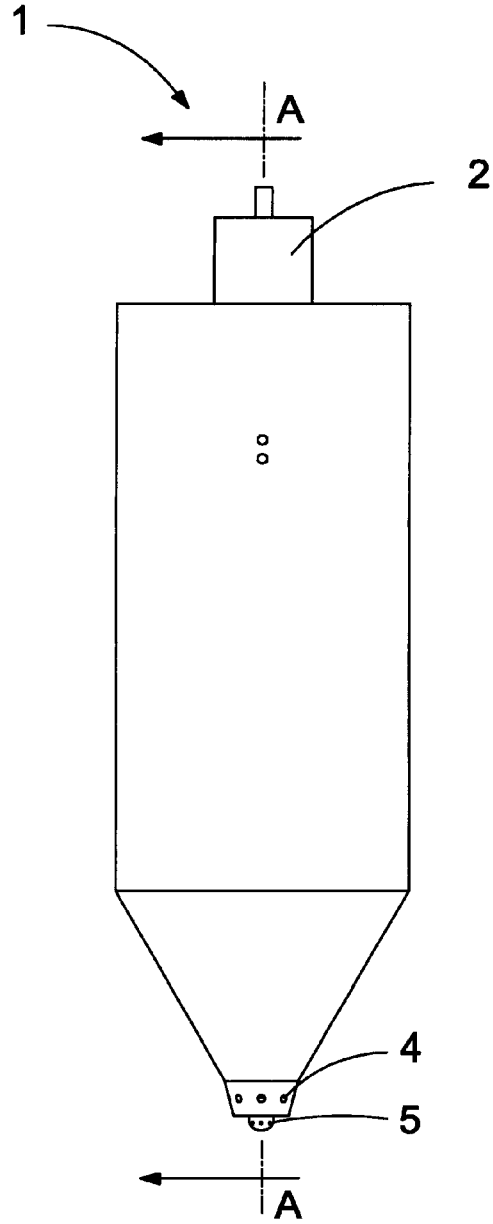
Figure 1                    Figure 2

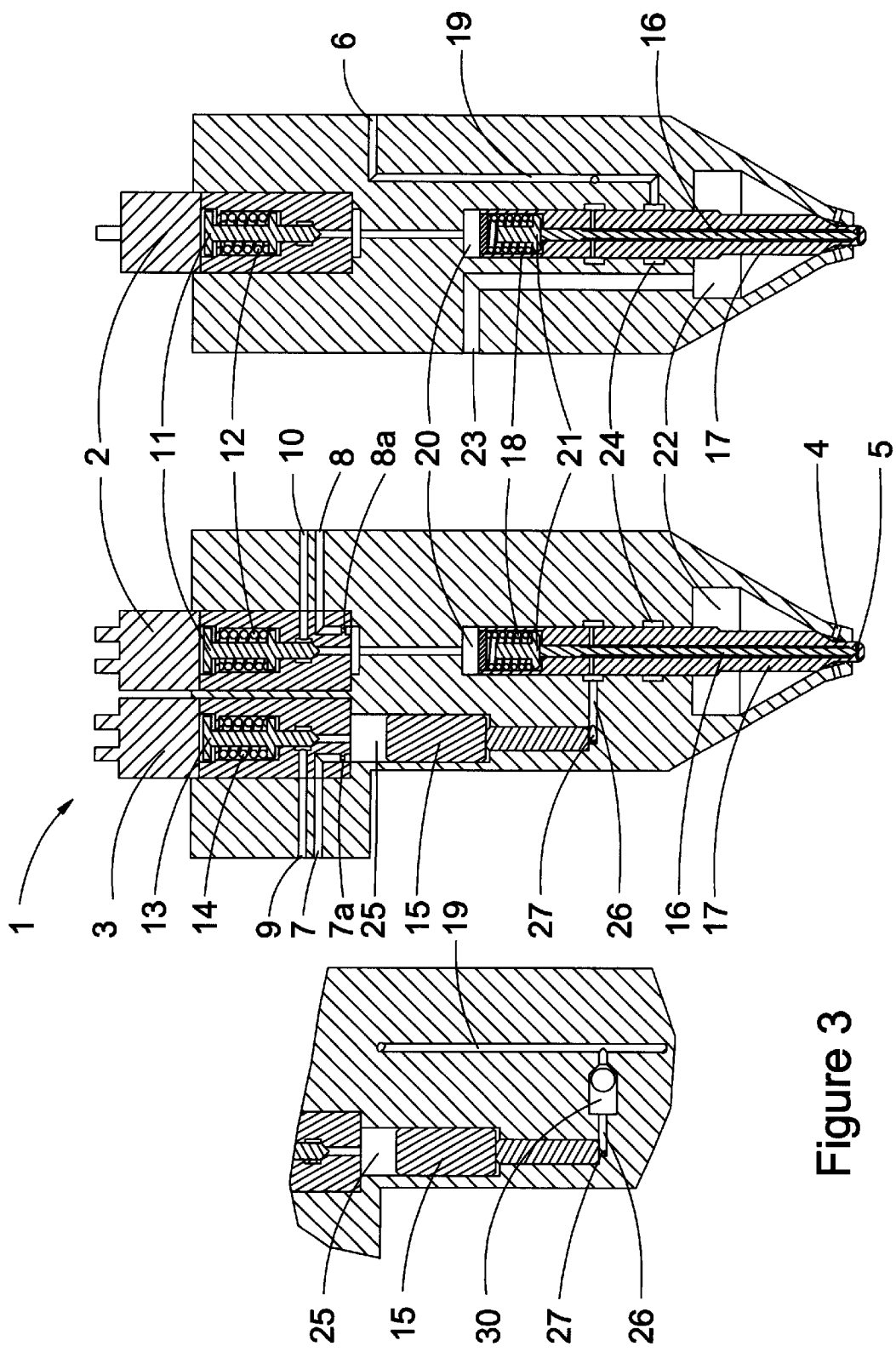

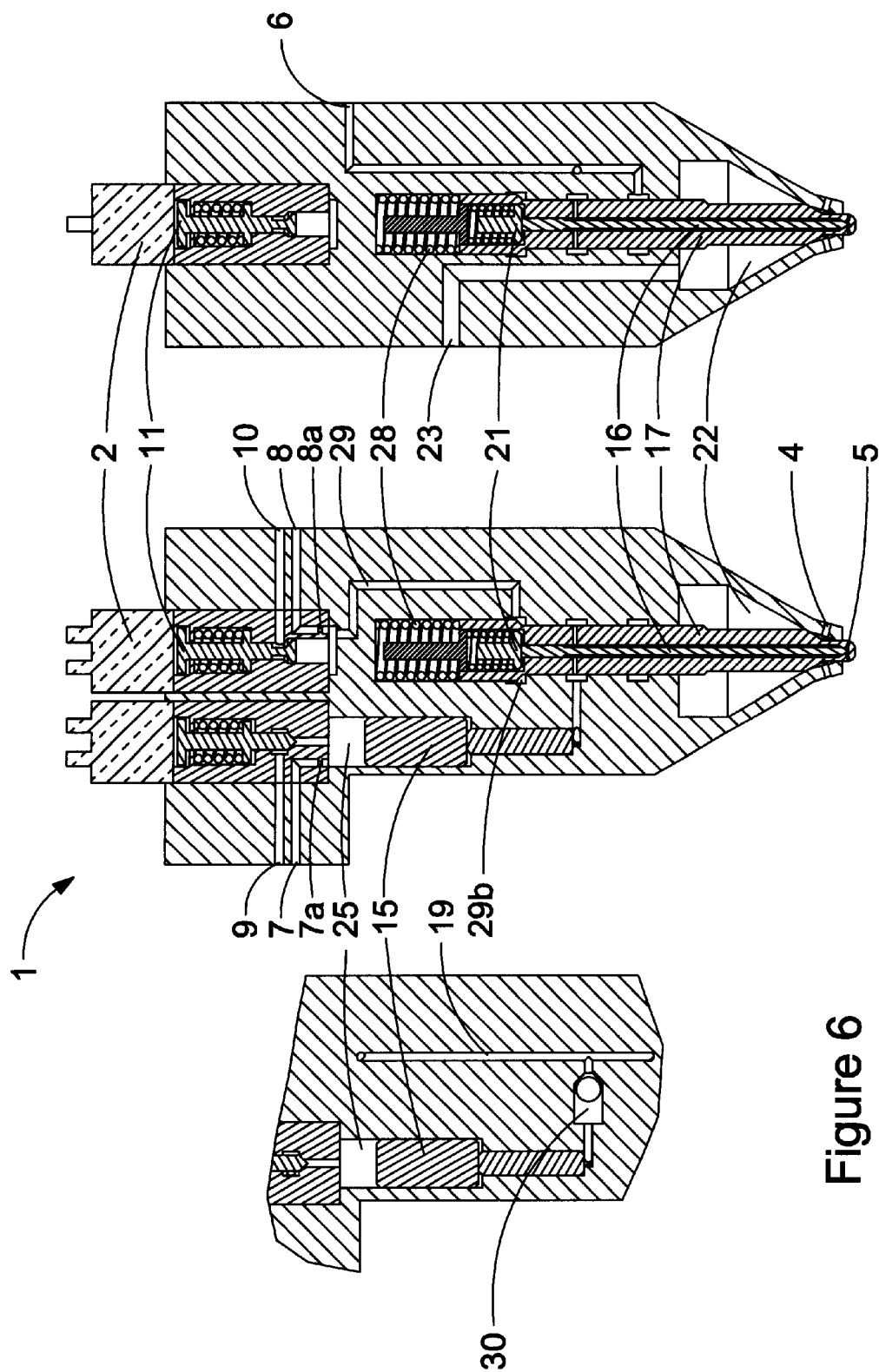

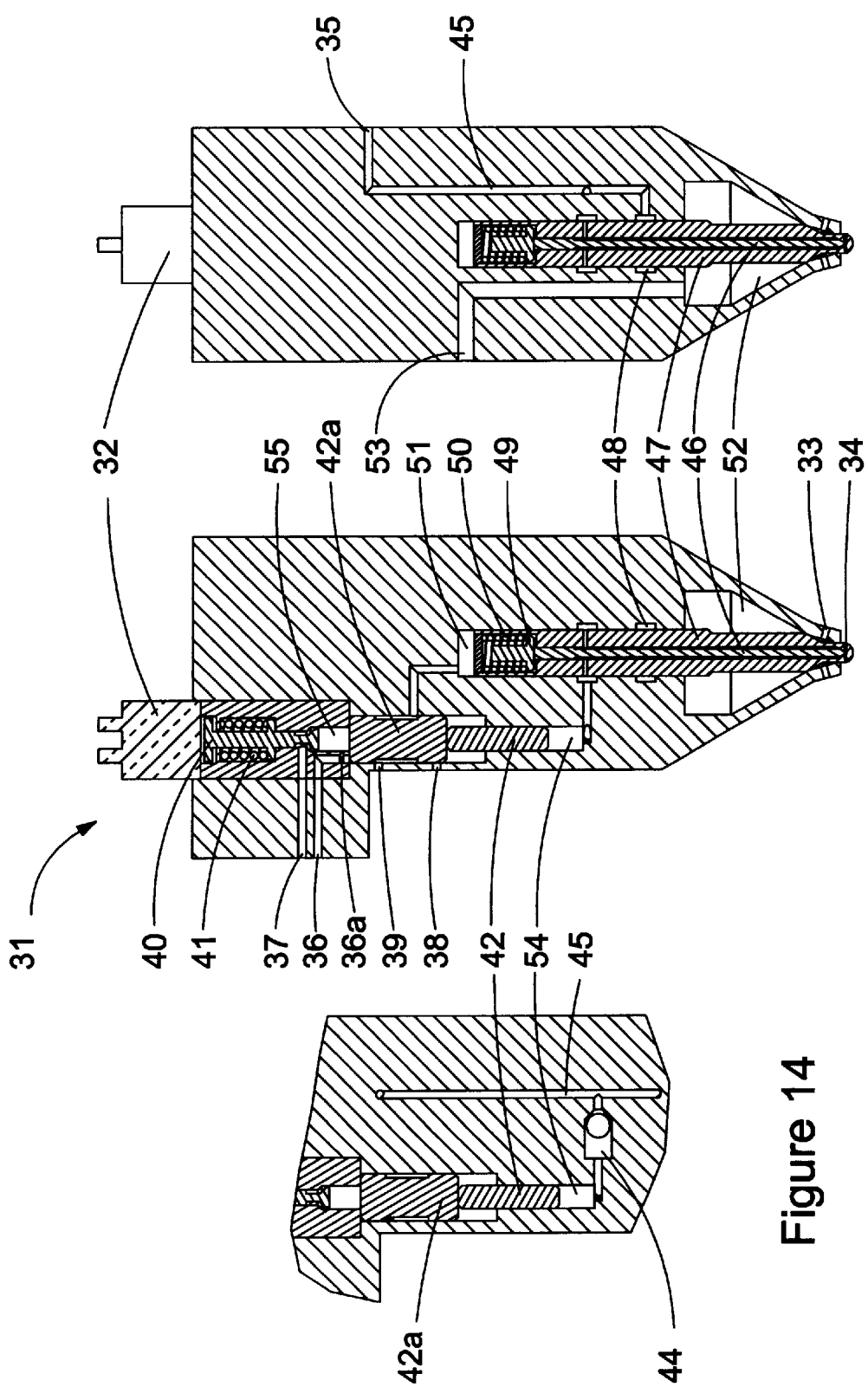

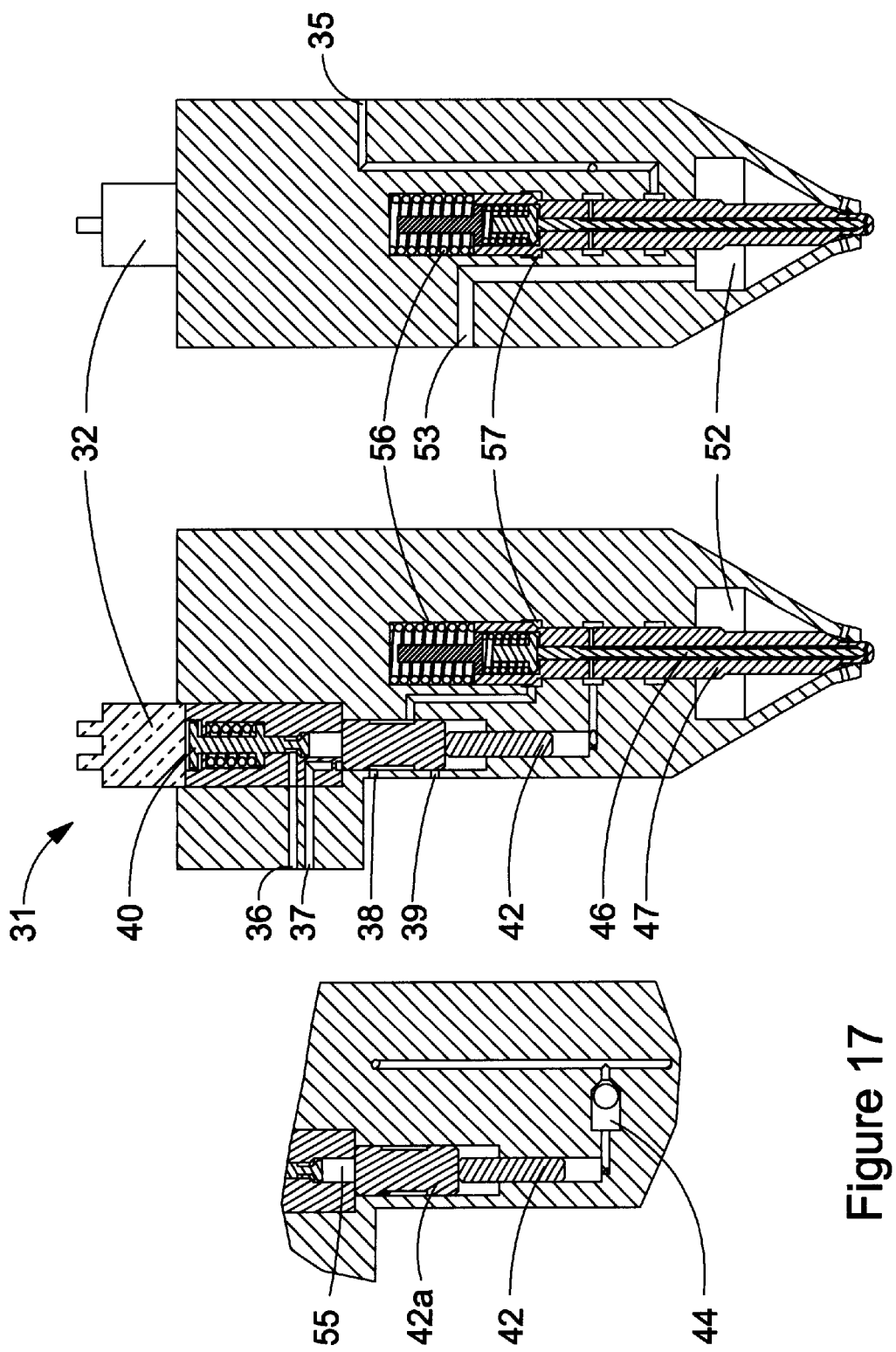

GASEOUS AND LIQUID FUEL INJECTOR WITH A TWO WAY HYDRAULIC FLUID CONTROL VALVE

CROSS-REFERENCE TO RELATED APPLICATION

This application is a continuation-in-part of U.S. patent application Ser. No. 09/154,103 filed Sep. 16, 1998, entitled "Gaseous and Liquid Fuel Injector", now U.S. Pat. No. 6,073,862 issued Jun. 13, 2000. The '103 application is incorporated herein by reference in its entirety.

FIELD OF THE INVENTION

The present invention relates to a novel hydraulically actuated dual fuel injector for an internal combustion engine. More particularly, the application pertains to a hydraulically actuated injector for injecting controlled quantities of a first fuel and a second fuel into an internal combustion diesel engine at different times.

BACKGROUND OF THE INVENTION

Because of its ready availability, low cost and potential for reducing particulate emissions, natural gas is a promising candidate for fuelling diesel engines. Known methods for converting a conventional diesel-fuelled engine (that is, a compression-ignition engine) to consume natural gas fall into three general approaches:

(1) Converting the engine to a stoichiometric or lean-burn spark-ignition engine;
(2) Converting the engine to natural gas using a "dual-fuel" technology, in which the natural gas is mixed with all of or with a portion of the intake air and is ignited by diesel fuel injected at the end of the compression stroke; and
(3) Converting the engine to directly inject the natural gas fuel into the combustion chamber, with a source of ignition.

The differences between these three approaches are elaborated upon in the more detailed discussions of these methods in the following paragraphs. However, the preferred method, is the direct injection method because it is the only method that preserves the inherent favorable operating characteristics and high efficiency of conventional diesel-fuelled engines.

(1) Fuelling Diesel Engines with Premixed Air and Natural Gas—Spark Ignition A conventional diesel-fuelled engine can be converted to natural gas by injecting natural gas with the intake air and allowing the mixture to enter the chamber through the intake valve. The mixture, stoichiometric or lean, can then be ignited near top dead center using spark plugs. However, to avoid detonation of the mixture, the compression ratio of the engine must be reduced. A reduction in compression ratio is accompanied by a reduction in efficiency, or equivalently by an increase in fuel consumption. Furthermore, to maintain the strength of the mixture under all conditions, the intake air must be throttled, causing pumping losses and further increasing the fuel consumption required to maintain equivalent power. These losses are especially pronounced at low or part load levels, which are the predominant operating conditions of automotive engines. Typically, the conversion of diesel engines to stoichiometric or lean-burn combustion of natural gas with spark plug ignition offers a considerable reduction in harmful emissions, but also leads to an increase in fuel consumption.

(2) Fuelling Diesel Engines with Premixed Air and Natural Gas Pilot Injection In this method, the natural gas is generally admitted in the intake air and enters the combustion chamber through the intake ports or valve. The mixture is ignited near top dead center by the injection of pilot diesel fuel. There are, however, fundamental complications with this method:

1. At low load, with unthrottled diesel operation, the gas fuel and air mixture is too lean for satisfactory combustion. The fuel consumption increases under these conditions and the hydrocarbon emissions also increase. Remedies to this situation include:
   a. Reverting to diesel fuel operation at low loads—in some applications where substantial part load conditions exist this remedy defies the purpose of the fuel substitution.
   b. Throttling of the intake air, which is complicated when the engine is equipped with turbochargers because of the danger of compressor surge (although with modern electronic-controlled waste gates this may be avoidable). In any case, such throttling removes an inherent advantage of diesel operation.
   c. Skip-firing, which consists of not firing the cylinders at each cycle but rather at every other cycle. This method does not usually permit smooth engine operation, particularly on 4 cylinder engines, and is usually too unstable for idling, requiring straight diesel operation.
2. Because a premixed fuel-air mixture exists during the compression, there is a danger of knocking (an uncontrolled combustion of the mixture), with potential engine damage. Thus, reduction in compression ratio may be required. If a reduction in compression ratio is chosen, the engine efficiency is compromised. If the compression ratio is maintained, the amount of natural gas used under each condition must be limited such that the mixture formed is not prone to knocking. This means that more diesel fuel must be used to sustain high load cases.

This pilot ignition method and the previously discussed spark ignition method are not well suited for 2-stroke engines because a substantial amount of the intake charge flows out the exhaust valve in two-cycle engines and is wasted. To avoid this bypass, and to improve on the low load combustion characteristics, it has been proposed to inject the natural gas directly into the combustion chamber after all valves or ports are closed, but still at a relatively low pressure. This adds difficulty because a new injection system control is needed, modifications to the head or block are required, and metering the gaseous fuel and ensuring stratification is difficult.

So far as is known, this second method has been proven capable of maintaining the efficiency over a wide range of load and speeds only by retaining a substantial amount of diesel fuel to compensate for the above problems.

(3) Direct Injection of Natural Gas into Diesel Engine Cylinders

The great advantage of directly injecting fuel into the engine cylinders in diesel operation is that it permits efficient and stable burning over the whole load range. This is because the burning occurs in local regions in which the fuel-air ratio is within the prescribed flammability limits. When a gaseous fuel such as natural gas is substituted for diesel fuel, the gaseous fuel has an advantage over diesel fuel in that it does not require atomization into micron-sized droplets and thus does not require very high injection pressures. For diesel injection, pressures as high as 1000 atmospheres are required for most efficient operation. For a gaseous fuel such as natural gas, pressures of 200 atmospheres are satisfactory. The principal difficulty with the direct injection of natural gas is that natural gas will not self-ignite, as diesel fuel does, at the typical temperature and pressure range of a diesel engine. To overcome this difficulty, another source of ignition must be provided. Examples of ignition sources are: (a) a small quantity of self-igniting pilot diesel fuel injected with or separate from the natural gas, and (b) glow plugs or hot surfaces and the like. For economic reasons, it is desirable to limit the necessary modifications to the engine. In that respect, an advantageous design employs a dual-fuel injector that fits in the same opening as a conventional single-fuel injector so that both a pilot fuel and a gaseous fuel can be injected into the combustion chamber without modifying the engine block or cylinder head.

Successful operation of large bore diesels with direct injection of compressed natural gas has been demonstrated in North America, as discussed in the following publications:

1. J. F. Wakenell, G. B. O'Neal, and Q. A. Baker, "High Pressure Late Cycle Direct Injection of Natural Gas in a Rail Medium Speed Diesel Engine", SAE Technical Paper 872041;
2. Willi, M. L., Richards, B. G., "Design and Development of a Direct Injected, Glow Plug Ignition Assisted, Natural Gas Engine", ICE—Vol. 22, Heavy Duty Engines: A look at the Future, ASME 1994; and
3. Meyers. D. P., Bourn, G. D., Hedrick, J. C., Kubesh, J. T., "Evaluation of Six Natural Gas Systems for LNG Locomotive Applications", SAE Technical Paper 972967.

Meyers et al. at the Southwest Research Institute demonstrated the superiority of the direct injection of natural gas over other means of fuelling a locomotive engine with natural gas. The direct injection of natural gas led to the best thermal efficiency for the targeted reduction of nitrogen oxide emissions. They used two separate injectors to accomplish the injection of the two fuels. The gas injector was hydraulically actuated and electronically controlled and was mounted at an angle in the combustion chamber. The original diesel fuel injector was used, but with smaller holes to reduce the amount of diesel pilot fuel injected.

The work by Wakenell et al. carried out at Southwest Research Institute, involved direct injection of natural gas into a large bore (8.5 inch) 2-stroke, locomotive diesel engine. The natural gas was stored in liquid form (LNG), then pumped to high pressures of 5000 psi (340 atm). Full rated power was achieved with less than 2% pilot diesel fuel (98% natural gas) and thermal efficiency was slightly lower than 100% diesel operation. The gas injector valve replaced the diesel injector and a small diesel injector was installed in the "test-cock" hole in the cylinder head. The gas injector was hydraulically actuated, with an independent hydraulic pump supplying the high-pressure hydraulic fluid.

Willi and Richards at Caterpillar demonstrated the possibility of using glow plugs to ignite the directly injected natural gas in a diesel engine. The results indicated equal or better thermal efficiency and nitrogen oxide emissions and reduced particulate matter. The injector used for this application is a modified HEUI injector from Caterpillar (which is the subject of SAE papers 930270 and 930271 and inferentially in U.S. Pat. Nos. 5,181,494, 5,191,867, 5,245,970 and 5,143,291). The injector, designed for gas injection only, contains a mechanism to control the injection rate of the gaseous injection. Pressurized oil is supplied from a common pump, and is intensified within the injector. There appears to be no means for injecting a pilot fuel.

The following Norwegian publications disclose injection of gaseous fuel in diesel engines:

1. Einang, P. M., Korea, S., Kvamsdal, R., Hansen, T., and Sarsten, A., "High-Pressure, Digitally Controlled Injection of Gaseous Fuel in a Diesel Engine, with Special Reference to Boil-Off from LNG Tankers", Proceedings CIMAC Conf., June 1983;
2. Einang, P. M, Engja, H., Vestergren, R., "Medium Speed 4-stroke Diesel Engine Using High Pressure Gas Injection Technology", Proceedings CIMAC Conf., 1987.

Einang et al. (1983), in Norway, conducted tests involving the direct injection of natural gas into a 2-stroke marine diesel engine through a separate gas injector, the original diesel fuel injector being used for pilot ignition. With 73% natural gas proportion, the thermal efficiency of the natural gas fuelled engine was slightly better than diesel fuelling. The NOx emissions were reduced by some 24%. No details of the gas injector were released. The subsequent work [1987] involved the direct injection of natural gas with pilot diesel fuel in a four-stroke engine. A combined gas/oil injection valve was used, but no details of that injector are disclosed in the publication.

In Finland, the following publication is of interest:

1. Verstergren, R., "The Merits of the Gas-Diesel Engine", ASME ICE—Vol. 25-3, 1995.

Dual fuel injectors are not detailed in the Verstergren publication, but appear in a number of publications and patents discussed below.

From Japan and Denmark, the following publications are of interest:

1. Miyake, M., Endo, Y., Biwa, T., Mizuhara, S., Grone, O., Pedersen, P. S., "Recent Development of Gas Injection Diesel Engines", CIMAC Conf., Warsaw, 1987;
2. Biwa, T., Beppu, O., Pedersen, P. S., Grone, O., Schnohr, O., Fogh, M., "Development of the 28/32 Gas Injection Engine", MAN B&W;
3. Miyake, M., Biwa, T., Endoh, Y., Shimotsu, M., Murakami, S., Komoda, T., "The Development of High Output, Highly Efficient Gas Burning Diesel Engines", 15th CIMAC Conference, Paris, 1983, Proceedings, vol. A2, pp. 1193–1216;
4. Fukuda, T., Komoda, T., Furushima, K., Yanagihara, M., Ito, Y., "Development of the Highly Efficient Gas Injection Diesel Engine with Glow Plug Ignition Assist for Cogeneration Systems", JSME-ASME International conference in Power Engineering, ICOPE-93.

The Japanese work of Miyake et al. (Mitsui Engineering and Shipbuilding Co.) showed favorable results, with equivalent engine efficiency at 85% of engine load using 5% pilot diesel fuel in a large diesel engine (420 millimeter bore). Two injection systems are presented; the first one is the utilization of 2 separate injectors. In that instance, a gas injector design is discussed and is based on a hydraulically actuated needle. The source of hydraulic actuation is an engine driven actuator-pump. A single injector design capable of injecting both the pilot diesel fuel and the natural gas is also presented. The injector is also actuated by an external source of pressurized oil, and is based on concentric needles. However, the design is not well suited for smaller diesel engines, since the needle seats are not at the tip of the injector. This means that a substantial amount of fuel remains in the injector and can be injected late in the expansion stroke. This situation is not very important in an engine with high fuel consumption, but it leads to increased pollutant emissions and loss of efficiency in a smaller engine operating from idle to rated speed.

The same Japanese authors presented further refinements and tests in 1987. A new combined injector was presented based on two separate needle valves located upstream from the injector tip, one controlling the pilot diesel fuel and one controlling the natural gas. As mentioned above, this design is not well suited for smaller size engines, because of the amount of fuel trapped between the needle valve and the injector tip, resulting in late injection. Also, it is difficult to provide fine atomization of the pilot diesel fuel with a needle valve located away from the tip.

The Mitsui Engineering team also tested a system using direct injection of natural gas only with glow plug ignition. In this case, a gas injection valve was used, but the schematic diagram reveals little information about the needle valve, which is actuated by high-pressure oil supplied by an external pump.

The work of the Japanese and Danish team on the 28/32 Engine (MAN B&W Diesel and Mitsui) also featured a single injector capable of handling pilot diesel fuel and natural gas fuel. This time, the design was based on two separate needle valves located upstream from the nozzle. The design featured high-pressure oil as a means of sealing the high-pressure natural gas. The 28/32 engine is a fairly large bore (280 millimeters) engine used for generators and in marine applications. The actuating oil was also supplied from an independent pump. The injector design includes a needle valve well upstream of the nozzle that is not suitable for smaller engines as explained previously.

Injectors for injecting fuel into the combustion chamber of an internal combustion engine have been known for many years. For example, the patents identified below disclose fuel injectors:

Baker U.S. Pat. No. 4,543,930 discloses an engine that includes a main fuel injector and a pilot fuel injector. The pilot and the main fuel may be the same fuel. The pilot injector injects from five to fifteen percent of the total fuel at different timings, depending upon the quantity of pilot fuel injected, the fuel cetane number and speed and load. The pilot fuel injector is directed toward the centerline of the diesel cylinder and at an angle toward the top of the piston. This avoids the walls of the cylinder. Stratification of the early injected pilot fuel is needed to reduce the fuel-air mixing rate, prevent loss of pilot fuel to quench zones and keep the fuel-air mixture from becoming too fuel lean to become effective. The pilot fuel injector can include a single hole for injection of the fuel and is directed at approximately 48 degrees below the head of the cylinder.

Wood U.S. Pat. No. 4,416,229 discloses a system whereby diesel fuel is supplied to the cavity of an injector at a location near the valve seat. Alternative fuel is supplied to the cavity of the injector. The diesel fuel is supplied at a relatively low pressure that does not move the valve member to the open position. The alternative fuel is supplied at a relatively high pressure which is sufficient to move the valve member to the open position at intervals just prior to the movement of the piston of the cylinder of the chamber into which the fuel is to be injected into high center position during its compression stroke. The fuel supply prevents the back flow of fuel, and thus maintains the cavity filled with fuel, except when alternative fuel is displaced within the cavity by the supply of diesel fuel. A plume of both fuels having the diesel fuel at its tip is injected into the chamber to enable the diesel fuel to be ignited by the compression in the chamber and the alternative fuel to be ignited by the diesel fuel.

Kelgard U.S. Pat. No. 4,742,801 discloses a dual fuel engine that is operated with straight diesel fuel or with gaseous fuel and pilot injection of diesel fuel. The Kelgard disclosure is primarily concerned with dual fuel engines for use in over the-road vehicles but it has other applications. The Kelgard disclosure also contemplates using the heat from the cooling water of the jackets of the engine to vaporize a liquid fuel into a gaseous state that is thereafter injected directly into the cylinders of the engine during operation on the dual fuel cycle.

Hill et al. U.S. Pat. No. 5,067,467 discloses a novel device for compressing and injecting gaseous fuel from a variable pressure gaseous fuel supply into a fuel receiving apparatus. The integrated intensifier-injector compresses and injects gaseous fuel from a variable pressure source into the cylinder of a positive displacement engine. The intensifier-injector for gaseous fuels in an internal combustion engine comprises a device which utilizes the compressed gas from the chamber of the internal combustion engine, or compressed fluid or gas from an external compressor, to drive an intensifier means which raises the pressure of fuel gas supplied to the internal combustion engine for rapid late-cycle injection into the cylinder of the internal combustion engine. In this device, gaseous fuel and liquid pilot fuel are mixed together and injected through the same holes.

Hill et al. U.S. Pat. No. 5,315,973 discloses a related device for compressing and injecting gaseous fuel from a variable pressure gaseous fuel supply into the fuel receiving apparatus. The intensifier-injector for gaseous fuels in an internal combustion engine comprises a mechanism which utilizes the compressed gas from an external compressor to drive an intensifier means which raises the pressure of fuel gas supplied to the internal combustion engine for rapid late-cycle injection into the cylinder of the internal combustion engine. In this device, the gaseous fuel and liquid pilot fuel are mixed together and injected through the same holes.

Tarr et al. U.S. Pat. No. 5,329,908 discloses a related fuel injector that has a gas accumulator having a volume that is at least ten times the volume of the maximum amount of fuel that would be injectable by the disclosed injector. A solenoid-operated poppet valve with an end face that opens into the combustion cylinder and is shaped to deflect a portion of the fuel injected into direct contact with the ignition plug is also disclosed. In a first embodiment, using a variable fuel supply, an electronic control unit (ECU) controls the injection timing to inject the compressed gas into the respective cylinders as each cylinder's piston nears its top dead center position to obtain diesel engine-like efficiencies so long as the compressed gas supply pressure is sufficiently high. When the compressed gas supply pressure becomes too low for high efficiency operation, the ECU changes the manner of operation so that fuel is injected into the engine when the piston is near its bottom dead center position so that it can be premixed with air prior to ignition to produce gasoline engine-like efficiencies.

In summary, Baker U.S. Pat. No. 4,543,930 and Kelgard U.S. Pat. No. 4,742,801 employ two injectors. Wood U.S. Pat. No. 4,416,229, Hill et al. U.S. Pat. No. 5,067,467 and Hill et al. U.S. Pat. No. 5,315,973 inject the two fuels together. Tarr et al. U.S. Pat. No. 5,329,908 employs solenoid actuation of a gas injector only.

The Finnish work at Wartsila Diesel International pertains to the usage of directly injected natural gas with pilot diesel fuel and indicates the potential of the technology to use natural gas while retaining the high power output of diesel engines.

Wartsila Diesel International Oy of Finland owns the following patents and patent applications relating to dual fuel injectors:

1. European Patent Application No. 92305415.9, filed Jun. 12, 1992, entitled "Improved Fuel Injection Valve Arrangement and Engine Using Such an Arrangement";
2. U.S. Pat. No. 5,199,398, filed Jun. 8, 1992, entitled "Fuel Injection Valve Arrangement";
3. European Patent No. 0778410, filed Jun. 12, 1996, entitled "Injection Valve Arrangement for an Internal Combustion Engine";
4. European Patent No. 0787900, filed Jan. 28, 1997, entitled "Injection Valve Arrangement";
5. European Patent No. 0718489, filed Jun. 12, 1996, entitled "Injection Arrangement for an Internal Combustion Engine"; and
6. U.S. Pat. No. 5,060,610, filed Sep. 21, 1990, entitled "Combustion Process for Internal Combustion Engine Using Gaseous Fuel".

Nylund U.S. Pat. No. 5,199,398 and European Patent No. 0520659 Al disclose a fuel injection valve arrangement for so-called dual fuel engines using a pilot fuel needle and an axially movable, substantially hollow valve member permitting the injection of a gaseous fuel. The two needles are separately controllable.

European Patent No. 0778410 (Nylund) discloses an injection valve arrangement for an internal combustion engine using a pilot needle and at least two valves for the injection of the gaseous fuel. The pilot fuel injection is controlled externally to the injector, while a main valve controls the admitting of hydraulic fluid to actuate the gas needle injection valves.

European Patent No. 0718489 Al (Hellen) discloses an injection arrangement for an internal combustion engine using a pilot needle and a separately controllable valve for the injection of a different medium. The pilot fuel injection is controlled externally to the injector, while a main valve controls the admitting of hydraulic fluid to actuate the different medium injection valve.

European Patent No. 0787900 (Jay and Prillwitz) discloses an injection valve arrangement with two injection valves to inject an additional pressure medium into the combustion chamber of an internal combustion engine.

Nylund U.S. Patent No. 5,199,398, European Patent No. 0520659 Al, European Patent No. 0778410, European Patent No. 0718489 Al (Hellen) and European Patent No. 0787900 (Jay and Prillwitz) employ two different sources of fluid for the actuation of the usual liquid fuel and that of the additional fuel. Also, the metering of the liquid or pilot fuel is performed externally, rather than internally, to the injector.

U.S. Pat. No. 4,736,712 discloses a self-purging dual fuel injector that sequentially injects two fuels through the same series of holes. Because the same series of holes is used for both fuels, the fuels must have a similar density in order to maintain reasonable injection duration. The disclosed invention does not discuss the actuation of the needle used.

SUMMARY OF THE INVENTION

A dual fuel injector separately injects a first fuel and a second fuel into a combustion chamber of an internal combustion engine. The injector comprises:

(a) an injector body;
(b) a hydraulic fluid inlet port formed in the injector body for enabling pressurized hydraulic fluid from a hydraulic fluid source to be introduced into the interior of the injector body, the hydraulic fluid being of a pressure slightly above that of the gaseous fuel pressure within the injector body to maintain sealing and to prevent leakage of gaseous fuel into the hydraulic fluid;
(c) a first fuel inlet port formed in the injector body for enabling the first fuel to be introduced into the interior of the injector body;
(d) a first injection valve located within the injector body and fluidly connected to the first fuel inlet port for controlling injection of the first fuel from the injector through at least one first fuel ejection port or orifice;
(e) a second fuel inlet port formed in the injector body for enabling the second fuel to be introduced into the interior of the injector body;
(f) a second injection valve located within the injector body and fluidly connected to the second fuel inlet port for controlling injection of the second fuel from the injector through at least one second fuel ejection port or orifice;
(g) a first two-way control valve for controlling the flow of the hydraulic fluid to actuate the first injection valve;
(h) a second control valve for controlling the flow of the hydraulic fluid to actuate the second injection valve;
(i) a metering device located within the injector body for metering the amount of the first fuel injected by the first injection valve;
(j) an intensifier device located within the injector body for increasing the pressure of the first fuel; and
(k) a seal within the injector body for preventing leakage of the second fuel into the first fuel.

The first control valve is preferably electronically controlled and electrically operated. For example, in a preferred embodiment the first control valve is actuated by a solenoid that is electronically controlled and electrically operated. The second control valve may also be a two-way valve that is electronically controlled and electrically operated.

The two fuels injected by the dual fuel injector may be a pilot fuel that is used to initiate combustion and a main fuel that provides the majority of fuel to the engine. For example, when the first fuel is a pilot fuel, it may be a liquid fuel such as diesel that auto-ignites at a lower temperature and pressure than the main fuel. In a preferred embodiment, the main fuel is a high-pressure gaseous fuel, such as natural gas, propane, or hydrogen, that burns cleaner and produces less NOx and particulate matter than an equivalent amount of diesel fuel (on an energy basis). When the pilot fuel is a liquid fuel such as diesel, it can also be used as the hydraulic fluid since it can be readily supplied from the pilot fuel supply system.

A preferred arrangement of the injector employs a first injection valve that is a needle valve. A preferred embodiment of the needle valve injects the first fuel by using intensified pilot fuel pressure within the first injection valve to provide the opening force to lift the valve needle away from the valve seat so that the first fuel may be injected through the first fuel ejection port(s). The valve needle preferably lifts away from the valve seat into the needle valve body, however, the valve needle could also lift away from the valve seat in the direction of the combustion chamber (known as a poppet-style valve). The closing force is preferably provided by a spring, such as, for example, a mechanical coil spring.

The second injection valve is also preferably a needle valve. In one preferred embodiment, high-pressure hydraulic fluid is directed to a hydraulic fluid chamber associated with the second injection valve to provide the closing force. When the hydraulic fluid is drained from the hydraulic fluid chamber, the pressure of the second fuel within a cavity of the injector body acts on the valve needle to provide the opening force to lift the valve needle away from the valve seat of the second injection valve. In an alternative embodiment, a spring is used to provide the closing force and the high-pressure hydraulic fluid is directed to a chamber associated with the second injection valve to apply the opening force. In this alternate embodiment the second injection valve returns to the closed position when the hydraulic fluid is drained from the hydraulic fluid chamber.

The seal provided within the injector body is preferably a fluid seal that comprises hydraulic fluid disposed within a cavity within the injector body. The seal operates to prevent leakage of the second fuel by filling the cavity with a hydraulic fluid that has a pressure that is higher than the pressure of the second fuel. The cavity is formed between the injector body and the needle of the second injection valve and prevents the second fuel from leaking through the gap between the injector body and the moveable valve needle. The hydraulic fluid used to fill the fluid seal is preferably the same hydraulic fluid that is employed to actuate the first and second needle valves.

In a preferred arrangement of the injector the first needle valve and the second needle valve are concentric with the first needle valve being the inner valve and the second needle valve being disposed in the annular space around the first needle valve. In this arrangement, the body of the first needle valve preferably acts as the needle for the second needle valve. In this arrangement, the second fuel is ejected through ports located in the tip of the injector body, and the first fuel is ejected through ports located in the tip of the second needle valve.

The metering device is preferably integral with the intensifier device. In a preferred embodiment the intensifier comprises a piston disposed within a cylinder with one side of the piston facing a chamber that may be filled with high-pressure hydraulic fluid and the other side of the piston facing a chamber that is in fluid communication with the fluid passages that supply the first fuel to the first injection valve. The first fuel is metered by the amount of fuel that is drawn into the fuel chamber associated with the intensifier piston. This amount is determined by the movement of the piston and how far it moves to expand the volume of the fuel chamber. The pressure of the first fuel is intensified when high-pressure hydraulic fluid is directed into the chamber on the opposite side of the piston, causing the piston to move to expand the volume of the hydrualic fluid chamber and to reduce the volume of the fuel chamber. Thus the fuel within the fuel chamber is compressed, intensifying the pressure of the first fuel in the fluid passages and within the first injection valve. A one-way check valve prevents the pressurized first fuel from escaping to the fluid passages upstream of the intensifier. When the hydraulic fluid is drained from the hydraulic fluid chamber associated with the intensifier piston, the piston moves to reduce the volume of the hydraulic fluid chamber while drawing another another metered charge of first fuel into the fuel chamber for the next injection event. In this way, instead of using the hydraulic fluid to directly control the first injection valve, the hydraulic fluid is employed to actuate the intensifier, which in turn elevates the pressure of the first fuel to operate the first injection valve.

In another embodiment of the injector, the intensifier piston acts as a three-way valve for admitting and draining hydraulic fluid from a hydraulic actuation chamber for the second injection valve.

Another embodiment of a liquid and gaseous fuel injector for separately injecting a liquid fuel and a gaseous fuel into a combustion chamber of an internal combustion engine comprises:

(a) an injector body having formed therein:
    at least one hydraulic fluid inlet port for admitting hydraulic fluid into hydraulic fluid passages disposed within the interior of the injector body;
    a liquid fuel inlet port;
    a gaseous fuel inlet port; and
    at least one drain port for draining hydraulic fluid from the injector body;

(b) a liquid fuel injection valve that is maintainable in a closed position by a spring and that is openable to inject liquid fuel into the combustion chamber when liquid fuel pressure within the liquid fuel injection valve is sufficient to provide an opening force that overcomes the closing force applied by the spring, wherein hydraulic fluid pressure is employed to control the liquid fuel pressure;

(c) a first hydraulic actuator system for controlling the liquid fuel pressure within the liquid fuel injection valve, the first hydraulic actuator system comprising:
    a first hydraulic fluid chamber, wherein the liquid fuel pressure is controlled by controlling the hydraulic fluid pressure within the first hydraulic fluid chamber;
    a first hydraulic fluid passage fluidly connected to the first hydraulic fluid chamber, wherein a two-way valve is employed to control the flow of hydraulic fluid through the first hydraulic fluid passage; and
    a second hydraulic fluid passage fluidly connected to the first hydraulic fluid chamber, wherein an orifice is employed to control the flow of hydraulic fluid through the second hydraulic fluid passage wherein one of the first and second hydraulic fluid passages is fluidly connected to the at least one hydraulic fluid inlet port and the other one of the first and second hydraulic fluid passages is fluidly connected to the at least one hydraulic fluid drain port;

(d) a gaseous fuel injection valve for controlling the injection of the gaseous fuel through the gaseous fuel injection port and into the combustion chamber, the gaseous fuel injection valve being hydraulically actuated by a second hydraulic actuator system that is in fluid communication with at least one of the hydraulic fluid passages within the injector body; and (e) a seal preventing leakage of the gaseous fuel within the injector body.

The liquid and gaseous fuel injector may further comprise a metering device for metering the amount of liquid fuel that is directed to the liquid fuel injection valve. The metering device may comprise, for example, a piston disposed within a cylinder. The hydraulic fluid pressure within the first hydraulic fluid chamber is applied to one side of the piston and the metered liquid fuel within a fuel chamber on the other side of the piston is compressed when the piston moves to reduce the volume of the fuel chamber, thereby intensifying the pressure of the metered liquid fuel.

The liquid and gaseous fuel injector preferably comprises a gaseous fuel injection valve that is operable between an open position and a closed position by elevating the hydraulic fluid pressure within a second hydraulic fluid chamber. In addition, the liquid and gaseous fuel injector may further comprise a second hydraulic actuator system for controlling the hydraulic fluid pressure within the second hydraulic fluid chamber. For example, the second hydraulic actuator system may comprise:

a third hydraulic fluid passage fluidly connected to the second hydraulic fluid chamber, wherein a two-way valve is employed to control the flow of hydraulic fluid through the third hydraulic fluid passage; and a fourth hydraulic fluid passage fluidly connected to the second hydraulic fluid chamber, wherein an orifice is employed to control the flow of hydraulic fluid through the fourth hydraulic fluid passage;

wherein one of the third and fourth hydraulic fluid passages is fluidly connected to the at least one hydraulic fluid inlet port and the other one of the third and fourth hydraulic fluid passages is fluidly connected to the at least one hydraulic fluid drain port.

BRIEF DESCRIPTION OF THE DRAWINGS

The drawings illustrate specific preferred embodiments of the invention, but should not be considered as restricting the spirit or scope of the invention in any way:

FIGS. 1 and 2 illustrate front and side elevation views of the double solenoid dual fuel injector.

FIGS. 3, 4 and 5 show respective detail, side and front section views of a first embodiment of a double solenoid dual fuel injector taken along section lines C—C, A—A, and B—B shown externally in FIGS. 1 and 2. This embodiment of the injector uses high-pressure hydraulic fluid to maintain the gaseous fuel valve in the closed position.

FIGS. 6, 7 and 8 show respective detail, side and front section views of a second embodiment of a double solenoid dual fuel injector taken along sections lines C—C, A—A, and B—B shown externally in FIGS. 1 and 2. This embodiment of the injector uses high-pressure hydraulic fluid to open the gaseous fuel valve.

FIGS. 14, 15, and 16 show respective detail, side and front section views of a first embodiment of single solenoid dual fuel injector taken along sections lines C—C, A—A, and B—B shown externally in FIGS. 12 and 13. This embodiment of the injector uses high-pressure hydraulic fluid to maintain the gaseous fuel valve in the closed position, and an intensifier-plunger that also functions as a three-way spool valve.

FIGS. 17, 18 and 19 show respective detail, side and front section views of a fourth embodiment of single solenoid dual fuel injector taken along sections lines C—C, A—A, and B—B shown externally in FIGS. 12 and 13. This embodiment of injector uses high-pressure hydraulic fluid to open the gaseous fuel valve, and an intensifier-plunger that also functions as a three-way spool valve.

DETAILED DESCRIPTION OF PREFERRED EMBODIMENT(S)

Figures 9, 10, 11:
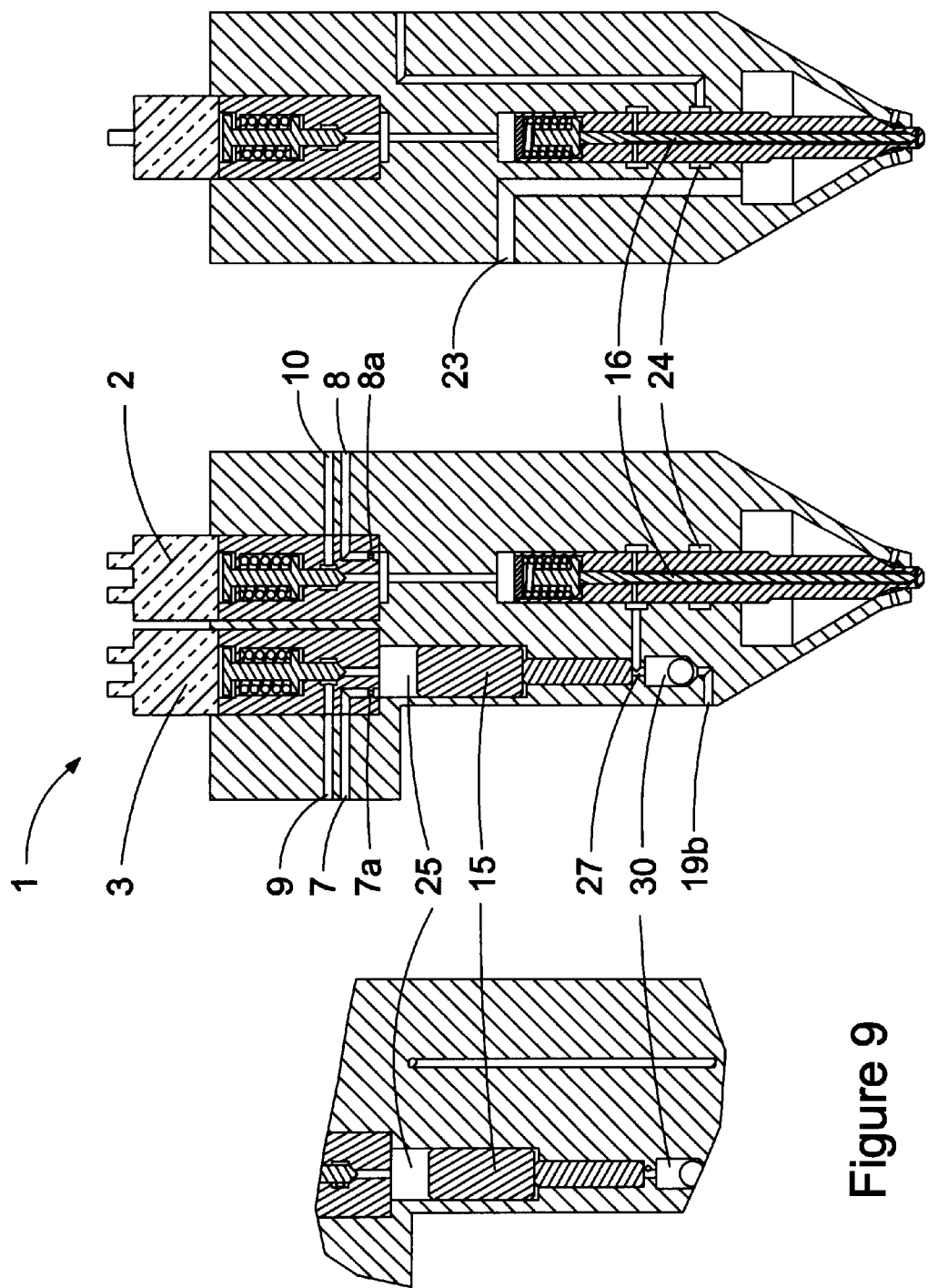
FIGS. 9, 10 and 11 show respective detail, side and front section views of a third embodiment of double solenoid dual fuel injector taken along section lines C—C, A—A and B—B, shown externally in FIGS. 1 and 2. This embodiment of the injector shows an injector in which the pilot fuel differs from the hydraulic fluid.

A dual fuel injector is capable of sequentially injecting a liquid pilot fuel and a main high-pressure gaseous fuel into a combustion chamber of an internal combustion engine. In preferred embodiments, the dual fuel injector is operated using a constant high-pressure source of hydraulic fluid (common rail) and one or two electrically-operated electronically-controlled hydraulic fluid control valves. In a preferred embodiment the injector has the following elements:

An inlet port for receiving pressurized hydraulic fluid from a constant pressure source (common rail);

Two concentric needle valves with fuel ejection ports located near the tip of the injector for governing the injection of two different fuels into an engine combustion chamber;

An electronically-controlled electrically-operated valve that controls the flow of the hydraulic fluid to actuate a pilot fuel needle valve;

A metering device for the pilot fuel, with an associated refilling mechanism;

A hydraulically or electrically operated hydraulic fluid control valve that controls the flow of the hydraulic fluid to actuate a gaseous fuel needle valve;

An inlet port for high-pressure gaseous fuel; and

A liquid seal for preventing the leakage of high-pressure gaseous fuel into the hydraulic actuating fluid. The liquid seal is filled with the pressurized hydraulic fluid, which is substantially confined therein.

In the preferred embodiment of the present injector the liquid fuel metering and injection mechanism and a gaseous fuel metering and injection system are all housed within the body of the injector. In addition, the same source of pressurized hydraulic fluid may be used for some or all of the following purposes: control valve actuation, fluid seals, and pilot fuel.

A number of embodiments that include the above preferred elements may be utilized to achieve the desired results. Accordingly, while these different embodiments share the common elements set out above, each embodiment may employ one or more alternative arrangements for particular aspects of the injector, such as, for example:

alternative arrangements for the hydraulic fluid actuation of the gaseous fuel needle valve (for example, the gaseous fuel needle valve may be biased to fail in the open or closed position if there is a loss of pressure in the hydraulic fluid system);

alternative arrangements for the actuation of the metering device; and alternative arrangements which employ a pilot fuel that is different from the hydraulic fluid.

Referring to the drawings, FIGS. 1 and 2 show front and side elevation views of an embodiment of the invention wherein two electrically-operated electronically-controlled hydraulic fluid control valves are used, one to control the injection of the pilot fuel and one to control the injection of the main gaseous fuel. Specifically, FIG. 1 shows a front view of the exterior of dual fuel injector 1, with dual solenoids 2 and 3 at the top and gaseous fuel ejection ports 4 and liquid fuel ejection ports 5 at the bottom. Solenoids 2 and 3 provide the means for electrically-operating the hydraulic fluid control valves. Conventional electronic controls may be used to control the activation of solenoids 2 and 3 to time the injection of the two separate fuels into the combustion chamber. FIG. 2 illustrates a side view of dual-fuel injector 1 with solenoid 2 at the top. In FIG. 2, solenoid 3 is hidden behind solenoid 2.

FIGS. 3 through 11 illustrate different internal embodiments of dual fuel injector 1. Since the exterior of injector 1 as illustrated in FIGS. 1 and 2 remains the same for the internal embodiments illustrated in FIGS. 3 to 11, for purposes of brevity, and to eliminate redundancy, FIGS. 1 and 2 are not repeated. For example, the internal construction for dual fuel injector 1 can be, for example, one of the three designs conceptually illustrated and discussed as embodiments 1(a), 1(b) and 1(c), in the following discussion relating to FIGS. 3 through 11.

1(a) Double Solenoid Dual Fuel Injector Using High Pressure Hydraulic Fluid to Close the Gaseous Fuel Needle Valve FIGS. 3, 4, and 5 show respective detail, side, and front section views of a first embodiment of double solenoid dual fuel injector taken along respective sections lines C—C, A—A, and B—B shown externally in FIGS. 1 and 2. Embodiment 1(a) uses high-pressure hydraulic fluid to maintain the gaseous fuel valve in the closed position.

FIGS. 3, 4, and 5 illustrate in detail the internal construction of embodiment 1(a) of dual fuel injector 1. In this embodiment, injector 1 has three fluid inlets 6, 7, and 8, two drain ports 9 and 10, top-mounted gaseous fuel control solenoid 2, and top mounted pilot fuel control solenoid 3. Injector 1 includes gaseous fuel control valve 11 and gaseous fuel control valve spring 12 positioned below gaseous fuel control solenoid 2. Injector 1 also includes pilot fuel control valve 13 and pilot fuel control valve spring 14 positioned below pilot fuel control solenoid 3. In embodiment 1(a), valves 11 and 13 are two-way valves and are biased in a position such that they are closed, blocking the hydraulic fluid passages that lead to respective drain ports 9 and 10 (as shown in FIG. 4). Injector 1 also includes pilot fuel intensifier 15, which is illustrated in FIGS. 3 and 4. Intensifier 15 is linked to and located below pilot fuel control valve 13.

As shown specifically in FIG. 3, check valve 30 is associated with intensifier 15. Fluid passage 19, as seen in FIGS. 3 and 5, connects pilot fuel inlet 6 to intensifier 15 through check valve 30. That is, check valve 30 permits the one-way flow of pilot fuel from fluid passage 19 into space 27 below intensifier 15.

Injector 1 has two concentrically disposed needle valves. The inner needle valve is pilot fuel needle valve 16. Pilot fuel needle valve 16 is biased in the closed position by needle valve spring 18 and the pressure of the hydraulic fluid within hydraulic fluid chamber 20. The outer concentric needle valve is gaseous fuel needle valve 17, which is disposed within the annular space around needle valve 16. A series of gaseous fuel ejection ports 4 are formed in the injector body at the tip of injector 1. Pilot fuel ejection ports 5 are formed in the hollow body at the tip of gaseous fuel needle valve 17. Ejection ports 4 and 5 and the associated tips of needle valves 16 and 17 are located at the tip of injector 1 to provide immediate injection of the gaseous fuel and pilot fuel into the engine combustion chamber (not shown).

Hydraulic fluid chamber 20 is located between gaseous fuel control valve 11 and gaseous fuel needle valve 17. Needle valve spring 18 is disposed around pilot fuel needle valve stop 21, which is located above pilot fuel needle valve 16. A hydraulic fluid passage connects hydraulic fluid chamber 20 to hydraulic fluid inlet port 8; orifice 8a, provided within the fluid passage, restricts flow of hydraulic fluid into hydraulic fluid chamber 20. When solenoid 2 is activated to open gaseous fuel control valve 11, the pressure within hydraulic fluid chamber 20 is reduced since the hydraulic fluid drains through drain port 10 faster than it can be replenished because orifice 8a restricts the flow from hydraulic fluid inlet 8.

Gaseous fuel cavity 22 is located in the bottom region of injector 1 and surrounds the lower portion of gaseous fuel needle valve 17. Gaseous fuel is supplied to cavity 22 through inlet 23. Differential pressures within injector 1 and particularly between gaseous fuel cavity 22 and the other cavities within the main body of injector 1 are sealed by a fluid seal comprising hydraulic fluid disposed within fluid seal cavity 24, as best seen in FIGS. 4 and 5.

Operation of Dual Fuel Injector Embodiment 1(a)

Hydraulic fluid pressurized to a substantially constant level by an engine driven pump (common rail system) is introduced through ports 7 and 8 into injector 1 (see FIGS. 4 and 5). Pilot fuel is introduced through inlet port 6. In a preferred arrangement, the pilot fuel and hydraulic fluid are the same and both are supplied to injector 1 from the common rail system.

In the two-way valve arrangement illustrated in FIGS. 4 and 5, inlet ports 7 and 8 are in constant fluid communication with respective chambers 25 and 20. Between injection events, gaseous fuel needle valve 17 and pilot needle valve 16 are in the closed position where they prevent fluid flow through respective ejection ports 4 and 5. Gaseous fuel control valve 11 and pilot fuel control valve 13 are both in the closed position when the fluid pressure within chambers 25 and 20 is substantially equal to the hydraulic fluid pressure introduced through respective ports 7 and 8. Pressurized pilot fuel from inlet port 6 also fills space 27 below intensifier 15 through fluid passage 19 (see FIG. 3). However, because the intensifier piston surface area facing chamber 25 is larger than the intensifier surface area facing space 27, when pilot fuel control valve 13 is closed, intensifier 15 assumes a position that maximizes the volume of chamber 25 and minimizes the volume of space 27 (as shown in FIGS. 3 and 4).

Pilot fuel inlet port 6 also supplies pressurized fluid (pilot fuel) to fluid seal cavity 24, where the pilot fuel provides a fluid seal around the moveable needle of gaseous fuel needle valve 17. When the pilot fuel is used for sealing, it is pressurized to a pressure slightly higher than that of the main gaseous fuel pressure within fuel cavity 22 to prevent the leakage of gaseous fuel past fluid seal cavity 24 (see FIGS. 4 and 5).

Between injection events, when injector 1 is not injecting any fuel, gaseous fuel control solenoid 2 and pilot fuel control solenoid 3 (see FIG. 4) are de-energized. As discussed above, respective gaseous fuel control valve 11 and pilot fuel control valve 13 below solenoids 2 and 3 are both in the closed position. Control valves 11 and 13 are biased in the closed position by respective coil springs 12 and 14. The pressurized hydraulic fluid in chamber 20 that has been delivered through port 8 maintains outer concentric gaseous fuel needle valve 17 in a closed position and may also help to maintain inner concentric pilot fuel needle valve 16 in a closed position. The compartment that houses spring 18 may be fluidly connected or sealed from chamber 20. When the spring compartment is fluidly connected to chamber 20, the pressure within the compartment is about equal to the pressure in chamber 20. When the spring compartment is sealed from chamber 20, the pressure within the compartment may be, for example, the same as the hydraulic fluid pressure at inlet 7 or drain 9. Depending upon the pressure within the spring compartment, the majority or all of the closing force applied to pilot fuel needle valve 16 is provided by needle valve coil spring 18.

The metering of pilot fuel by injector 1 is performed in one of two ways as described below. In both methods, pilot fuel solenoid 3 is first energized to cause the pilot fuel control valve 13 to move to the open position. Upon energizing pilot fuel control solenoid 3, control valve 13 connects chamber 25 above intensifier 15 with drain port 9; this causes the hydraulic fluid to drain from chamber 25 faster than it can be replenished through orifice 7a, which is provided in the fluid passage that connects chamber 25 with hydraulic fluid inlet 7. By draining the hydraulic fluid from chamber 25, the pressure above intensifier 15 is reduced to a pressure that is significantly lower than the pressure of the pressurized pilot fuel in space 27, resulting in intensifier 15 moving to reduce the size of chamber 25 and expand the size of space 27. Space 27 is filled with pilot fuel through open check valve 30.

In the first pilot fuel metering method, solenoid 3 is de-energized when the required amount of pilot fuel has been introduced into space 27 below intensifier 15. Solenoid 3 is then de-energized whereby pilot fuel control valve 13 returns to the closed position under the influence of pilot fuel control valve spring 14, closing the fluid passage from chamber 25 to drain port 9. Accordingly, hydraulic pressure is re-applied on top of intensifier 15 as hydraulic fluid from hydraulic fluid inlet 7 fills chamber 25. The restored fluid pressure within chamber 25 reverses the direction of intensifier 15 so that it moves to expand chamber 25 and compress the pilot fuel within space 27. The pilot fuel pressure is elevated within space 27 below intensifier 15 and within fluid passage 26. Fluid passage 26 fluidly connects check valve 30 to pilot fuel needle valve 16. The elevated pilot fuel pressure within fluid passage 26 causes check valve 30 to close. The elevated pilot fuel pressure within fluid passage 26 elevates the pilot fuel pressure within pilot fuel needle valve 16. The elevated pilot fuel pressure may be employed to open pilot fuel needle valve 16 against the bias of needle valve spring 18. Pilot fuel injection can thus be triggered by the de-energization of solenoid 3, since in preferred arrangements, pilot fuel injection substantially begins immediately after pilot fuel control valve 13 closes. According to the first pilot fuel metering method, the amount of pilot fuel that is metered is controlled by controlling the volume of expanding space 27. The volume of space 27 for each metered amount of pilot fuel for each pilot fuel injection event is determined by the position of intensifier 15 when it reverses direction to reduce the volume of space 27. Accordingly, the metering step must be performed immediately before pilot fuel injection occurs since pilot fuel injection begins substantially immediately after reversing the direction of intensifier 15 (that is, when solenoid 3 is de-energized).

In the second pilot fuel metering method, intensifier 15 moves until it reaches the end of chamber 25 and can move no further (that is the second method does not provide the option of controlling the amount of pilot fuel that is metered for each injection event by controlling the movement of intensifier 15 to reverse its direction before it reaches the end of chamber 25, as in the first method). According to the second method, the metering device is employed to meter out a substantially constant amount of pilot fuel. In this second method, the metering phase (when space 27 is expanding) can be performed well in advance of the pilot fuel injection event.

In either of the two foregoing pilot fuel metering methods, the injection of metered pilot fuel starts as solenoid 3 is de-energized and pilot fuel control valve 13 closes under the influence of spring 14. The pressure above intensifier 15 then rises, thereby resulting in intensifier 15 moving to expand the volume of chamber 25. The intensified pilot fuel pressure below intensifier 15 thus rises and is transmitted through fluid passage 26 (see FIG. 4). When the pilot fuel pressure within pilot fuel needle valve 16 is high enough to provide an opening force greater than the closing force applied by spring 18, pilot fuel needle valve 16 opens. The metered pilot fuel is then injected into the engine combustion chamber (not shown) through ejection ports 5 in the tip of gaseous fuel needle valve 17. The upward travel of internal pilot fuel needle valve 16 is limited by a mechanical stop 21 that limits the compression of needle valve spring 18.

When intensifier 15 reaches the end of its travel and a metered dose of pilot fuel is delivered to pilot fuel needle valve 16, some of the pressure within space 27 is relieved as pilot fuel is injected into the combustion chamber through ejection ports 5. The pressure of the pilot fuel within pilot fuel needle valve 16 eventually drops to a pressure that is too low to maintain pilot fuel needle valve 16 in an open position. Pilot fuel needle valve 16 then returns to a closed position and the injection of pilot fuel terminates.

In embodiment 1(a), the source of high-pressure pilot fuel supplied through inlet 6 is fluidly connected to fluid seal cavity 24, thereby preventing gaseous fuel from leaking from cavity 22 past fluid seal cavity 24. The minimum pilot fuel pressure supplied from inlet 6 to pilot fuel needle valve 16 is also high enough to prevent combustion gases within the combustion chamber from entering injector 1 through ejection ports 5.

The injection of gaseous fuel takes place when the gaseous fuel control solenoid 2 is energized. Upon energizing solenoid 2, valve 11 lifts and opens to fluidly connect chamber 20 with drain port 10. The hydraulic fluid in chamber 20 drains through drain port 10 faster than it can be replenished through orifice 8a, provided in the fluid passage that connects inlet port 8 to chamber 20. Accordingly, the pressure in chamber 20 is reduced allowing the high pressure of the gaseous fuel in cavity 22 to lift gaseous fuel needle valve 17 into the open position to thereby inject the gaseous fuel within cavity 22 into the engine combustion chamber through ejection ports 4. The injection of gaseous fuel stops when solenoid 2 is de-energized and gaseous fuel control valve spring 12 closes gaseous fuel control valve 11, causing gaseous-fuel needle valve 17 to move to a closed position, closing ejection ports 4.

1(b) Double Solenoid Dual Fuel Injector Using High-Pressure Hydraulic Fluid to Open the Gaseous Fuel Needle Valve FIGS. 6, 7, and 8 show respective detail, side, and front section views of a second embodiment of double solenoid dual fuel injector taken along sections lines C—C, A—A and B—B shown externally in FIGS. 1 and 2. Embodiment 1(b) of injector 1 uses high-pressure hydraulic fluid to open gaseous fuel valve 17. Embodiment 1(b) has many of the same components as embodiment 1(a) presented in FIGS. 3, 4 and 5, and like components are identified by like reference numbers. However, in embodiment 1(b) the actuation apparatus for gaseous fuel valve 17 is different from that of embodiment 1(a). Referring to FIG. 7, high-pressure hydraulic fluid enters injector 1 through fluid inlet 8. Gaseous fuel control valve 11 is a two-way valve that controls the hydraulic fluid pressure within fluid passage 29 by controlling the flow of hydraulic fluid through drain port 10. Gaseous fuel needle valve 17 is held in the closed position by coil spring 28. Coil spring 28 is not present in embodiment 1(a).

Injector 1 of embodiment 1(b) operates in essentially the same manner as embodiment 1(a) above, except for the manner in which the gaseous fuel is injected. With embodiment 1(b), upon energizing solenoid 2, two-way gaseous fuel control valve 11 moves to its closed position, thereby closing the fluid connection to drain port 10, and causing the pressure in cavity 29b to increase. When the combined forces of the hydraulic fluid pressure in cavity 29b and the gaseous fuel pressure in cavity 22 act on gaseous fuel needle valve 17 and are sufficient to overcome the closing force of coil spring 28, gaseous fuel needle valve 17 opens. The gaseous fuel within cavity 22 is then injected through ejection ports 4 provided in the tip of injector 1 and into the combustion chamber. A gaseous needle valve stop inside spring 28 limits the travel of needle valve 17 to limit the stress applied to coil spring 28. The injection of gaseous fuel stops when solenoid 2 is de-energized. Gaseous-fuel needle valve 17 then moves to a closed position, closing ejection ports 4 and terminating the injection of gaseous fuel.

All other features of the injector depicted in embodiment 1(b) remain substantially the same as those presented in embodiment 1(a).

1(c) Double Solenoid Dual Fuel Injector Using a Pilot Fuel Other than the Hydraulic Fluid FIGS. 9, 10 and 11 show respectively in detail, side, and front section views of a third embodiment of a double solenoid dual fuel injector taken along section lines C—C, A—A and B—B, shown externally in FIGS. 1 and 2. Embodiment 1(c) is the same as embodiment 1(a) with the exception of a new pilot fuel inlet 19b, which is fluidly connected to space 27 through check valve 30. The pilot fuel is supplied to inlet 19b at a pressure similar to that of the hydraulic fluid supplied to inlet 7.

The operation of embodiment 1(c) is similar to that of embodiment 1(a) except that inlet 19b allows the use of a pilot fuel that is different from the hydraulic fluid directed to fluid seal cavity 24. When solenoid 3 is energized, the pressure in chamber 25 declines as it does when solenoid 3 is energized in embodiment 1(a). The pressure of the pilot fuel in space 27 causes intensifier 15 to move to decrease the volume of chamber 25, and increase the volume of space 27 which fills with pilot fuel supplied from inlet 19b. One of two different pilot fuel metering sequences can be selected as set out in the description of embodiment 1(a). The gaseous fuel injection is identical to that described in embodiment 1(a). The pilot fuel injection apparatus of embodiment 1(c) could also be used in combination with the gaseous fuel injection apparatus of embodiment 1(b) although this particular combination is not illustrated in the figures.

Single Solenoid Dual Fuel Injector Using High-Pressure Hydraulic Fluid to Close the Gaseous Fuel Needle Valve (Embodiments 2(a) and 2(b))

Figure 12:
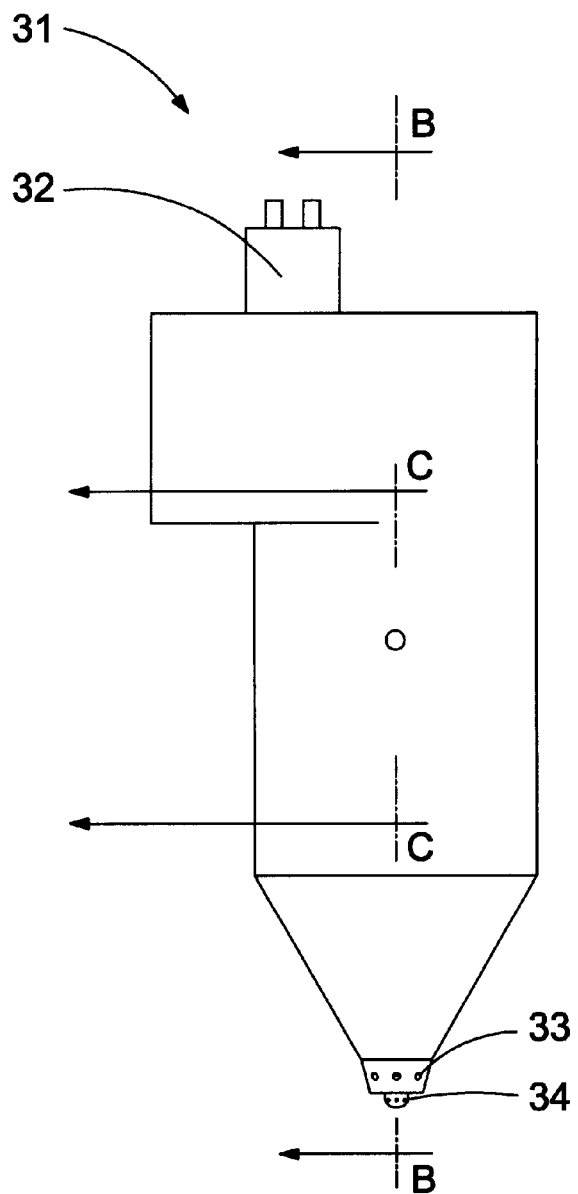
FIGS. 12 and 13 illustrate front and side elevation views of a single solenoid dual fuel injector.
Figure 13:
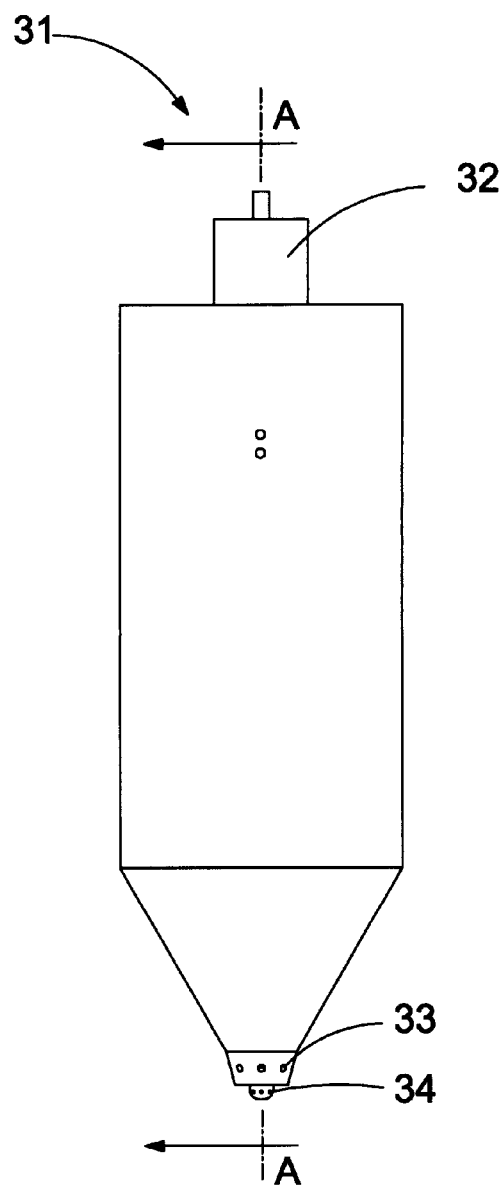

FIGS. 12 and 13 show respective front and side elevation views of an embodiment of the injector wherein a single solenoid actuated valve is used to control dual fuel injector 31. Dual fuel injector 31 has a single solenoid 32 mounted thereon. Pilot fuel ejection ports 34 and gaseous fuel ejection ports 33 are located near the injector tip, which is inserted into the engine combustion chamber. Again, for brevity, the exterior of single solenoid injector 31 is illustrated only once, although two different internal embodiments are illustrated in FIGS. 14 through 19 and discussed below (that is, first embodiment 2(a) uses hydraulic fluid pressure to close the gaseous fuel needle valve and second embodiment 2(b) uses hydraulic fluid pressure to open the gaseous fuel needle valve).

In preferred embodiments of injector 31, hydraulic fluid is pressurized to a constant level by an engine driven pump (that is, a common rail system). The pressurized hydraulic fluid is supplied to inlet ports 36 and 39 of injector 31, or alternatively, to a lesser number of inlet ports which employ internal fluid passages to direct the hydraulic fluid to the different hydraulic fluid chambers within injector 31. Pilot fuel is supplied to inlet port 35, and like in the other embodiments discussed herein, the pilot fuel is preferably the same as the hydraulic fluid and can be supplied from the same common rail system.

FIGS. 14, 15, and 16 show respective detail, side, and front section views of first embodiment 2(a) of single solenoid dual fuel injector taken along sections lines C—C, A—A, and B—B shown externally in FIGS. 12 and 13. Embodiment 2(a) employs an arrangement for controlling the injection of pilot fuel that is similar to that employed by embodiment 1(a). That is, solenoid 32 is energized to control the hydraulic fluid pressure above plunger 42a to control metering and intensification of pilot fuel. Pilot fuel control valve 40 is a two-way valve. Between injection events, control valve 40 is in the open position so that space 55 is fluidly connected to drain 37 and the pressure within space 55 is much less than the pressure in pilot fuel metering chamber 54. Accordingly, between injection events, intensifier 42 is held in a position where a constant amount of pilot fuel is drawn into pilot fuel metering chamber 54. In embodiment 2(a) plunger 42a also acts as a spool valve that controls the flow of hydraulic fluid to and from chamber 51. Between injection events, the recessed portion of plunger 42a is aligned with hydraulic fluid inlet 39 so that chamber 51 is fluidly connected to inlet 39 and chamber 51 is filled with high-pressure hydraulic fluid, which provides the closing force that acts on gaseous fuel needle valve 47.

When control valve 40 is closed, space 55 is disconnected from drain 37 and hydraulic fluid flows into space 55 through inlet 36 and orifice 36a, causing intensifier 42, including plunger 42a, to move to increase the volume of space 55 and reduce the volume of pilot fuel metering chamber 54. The pressure of the pilot fuel within metering chamber 54 is intensified as the volume of metering chamber is reduced. Pilot fuel needle valve 46 is in fluid communication with the pressure intensified pilot fuel in metering chamber 54 and the elevated pilot fuel pressure causes pilot fuel needle valve 46 to open, similar to the operation of pilot fuel needle valve 16 of embodiment 1(a).

When plunger 42a also acts as a spool valve, as it does in embodiment 2(a), intensifier 42 travels its full stroke so that the recessed portion of plunger 42a can align itself with drain 38 to relieve the hydraulic fluid pressure from chamber 51, thereby actuating gaseous fuel needle valve 47. The injection of the gaseous fuel preferably commences after commencing the injection of the pilot fuel. The timing of the gaseous fuel injection may be determined by the position of drain port 38 and/or the size of an orifice located on the drain line fluidly connected to drain port 38 that controls the rate of pressure drop within chamber 51. The injection of gaseous fuel is terminated when control valve 40 re-opens and plunger 42a travels to re-connect chamber 51 with inlet port 39, thereby also closing drain port 38 and re-filling pilot fuel metering chamber 54.

In an alternate arrangement wherein plunger 42a is not utilized as a spool valve, a second control valve may be employed to control the injection of gaseous fuel and intensifier 42 need not travel its full stroke for each injection event. Accordingly, in this alternate arrangement the amount of pilot fuel that is metered out each injection event may be modulated by reversing the direction of intensifier 42 and plunger 42a before it travels its full stroke.

The movement of intensifier 42 reverses when pilot fuel control valve 40 is opened. The hydraulic fluid within space 55 then drains through drain 37 faster than it can be replenished through inlet 36 and orifice 36a. Consequently, the pressure within space 55 is reduced so that intensifier 42 moves to expand pilot fuel metering chamber 54 until it again holds a metered amount of pilot fuel for the next injection event.

Pilot fuel inlet port 35, check valve 44, fluid passage 45, fluid seal 48, pilot fuel needle stop 49, and needle valve spring 50 function similarly to corresponding elements of embodiment 1(a), namely inlet port 6, check valve 30, fluid passage 19, fluid seal 24, pilot fuel needle stop 21, and needle valve spring 18 (see FIGS. 3 through 5). Pressurized gaseous fuel is supplied to cavity 52 through port 53.

Embodiment 2(b), shown in FIGS. 17, 18 and 19 retains the same basic components as those of embodiment 2(a) presented in FIGS. 14 to 16, except that with embodiment 2(b) the apparatus for actuating gaseous fuel needle valve 47 includes spring 56. Spring 56 is similar in operation to spring 28 which was described above in relation to dual solenoid embodiment 1(b) illustrated in FIGS. 9, 10 and 11. Gaseous fuel needle valve 47 is maintained in a closed position by coil spring 56. Gaseous fuel needle valve 47 opens when the opening force applied to the needle valve body by the hydraulic fluid pressure within chamber 57 and the gaseous fuel pressure within cavity 52 is sufficient to overcome the closing force exerted by spring 56. With reference to FIG. 18, in embodiment 2(b) the positions of inlet 39 and drain 38 are reversed compared to embodiment 2(a). Gaseous fuel needle valve 47 is closed when chamber 57 is fluidly connected to drain 38 and when intensifier 42 moves to compress the pilot fuel within pilot fuel injection valve 46, thereby injecting the pilot fuel, plunger 42a simultaneously moves so that inlet 39 is fluidly connected to chamber 57, thereby causing gaseous fuel needle valve 47 to open. An advantage of embodiments 1(b) and 2(b) is that if there is a loss of hydraulic fluid pressure, the gaseous fuel injection valve will be held in the closed position until the pressure within the hydraulic fluid system is restored.

An advantage of the single solenoid system disclosed and illustrated in FIGS. 12 to 19 is that only one solenoid is used (solenoid 32). Some disadvantages are that: (1) the quantity of pilot fuel is fixed; and (2) the main gaseous fuel needle valve actuation occurs at a fixed time relative to the pilot fuel injection.

As will be apparent to those skilled on the art in the light of the foregoing disclosure, many alterations and modifications are possible in the practice of this invention without departing form the spirit or scope thereof. Accordingly, the scope of the invention is to be construed in accordance with the substance defined by the following claims.

What is claimed is:

1. A dual fuel injector for separately injecting a first fuel and a second fuel into a combustion chamber, said injector comprising:
   (a) an injector body;
   (b) a hydraulic fluid inlet port formed in the injector body for enabling pressurized hydraulic fluid from a hydraulic fluid source to be introduced into a fluid seal within said injector body, said hydraulic fluid being of a pressure slightly above that of the second fuel within said injector body to maintain sealing and to prevent leakage of said second fuel into said hydraulic fluid;
   (c) a first fuel inlet port formed in said injector body;
   (d) a first injection valve located within said injector body and fluidly connected to said first fuel inlet port for controlling injection of said first fuel from said injector through at least one first fuel ejection port or orifice;
   (e) a second fuel inlet port formed in said injector body;
   (f) a second injection valve located within the injector body and fluidly connected to said second fuel inlet port for controlling injection of said second fuel from said injector through at least one second fuel ejection port or orifice;
   (g) a first two-way control valve for controlling the flow of the hydraulic fluid to actuate said first injection valve;
   (h) a second control valve for controlling the flow of the hydraulic fluid to actuate said second injection valve;
   (i) a metering device located within said injector body for metering the amount of said first fuel injected by said first injection valve;
   (j) an intensifier device located within said injector body for increasing the pressure of said first fuel; and
   (k) a seal within said injector body for preventing leakage of said second fuel into said first fuel.

2. The injector of claim 1 wherein said first control valve is electronically controlled and electrically operated.

3. The injector of claim 1 wherein said second control valve is a two-way valve.

4. The injector of claim 3 wherein said second control valve is electronically controlled and electrically operated.

5. The injector of claim 1 wherein said first fuel is a pilot fuel.

6. The injector of claim 1 wherein said second fuel is a high-pressure gaseous fuel.

7. The injector of claim 1 wherein said hydraulic fluid is the same fluid as said first fuel.

8. The injector of claim 1 wherein said first injection valve is a needle valve.

9. The injector of claim 8 wherein said second injection valve is a needle valve.

10. The injector of claim 9 wherein said seal is a fluid seal that comprises hydraulic fluid disposed within a cavity formed between the needle of said second needle valve and said injector body.

11. The injector of claim 9 wherein said first needle valve and said second needle valve are concentric with said second needle valve being disposed in an annular space around said first needle valve.

12. The injector of claim 11 wherein a body of said first needle valve acts as the needle for said second needle valve.

13. The injector of claim 1 wherein said metering device is integral with said intensifier device.

14. The injector of claim 1 wherein said seal is a fluid seal which is located between fluid cavities for said first fuel and said second fuel.

15. The injector of claim 2 wherein said first injection valve is controlled by a first solenoid.

16. The injector of claim 15 wherein said first solenoid controls admission of hydraulic fluid to said intensifier and said intensifier controls admission of said first fuel to said first fuel injection valve.

17. The injector of claim 4 wherein the second injection valve is controlled by a second solenoid.

18. The injector of claim 13 further comprising a one-way check valve that controls admission of hydraulic fluid from a hydraulic fluid inlet to a metering chamber of said metering device.

19. The injector of claim 1 wherein said second fuel ejection port is located in a tip of said injector body, and said first fuel ejection port is located in a tip of said second needle valve.

20. The injector of claim 15 wherein said first injection valve is biased by a spring.

21. The injector of claim 17 wherein said second injection valve is biased by a spring.

22. The injector of claim 9 wherein said first and second injection valves are each biased by at least one spring.

23. The injector of claim 1 wherein the intensifier acts as a three-way valve for admitting and draining hydraulic fluid from a hydraulic actuation chamber for said second injection valve.

24. A fuel injector for separately injecting a liquid fuel and a gaseous fuel into a combustion chamber of an internal combustion engine comprising:

(a) an injector body having formed therein:
   at least one hydraulic fluid inlet port for admitting hydraulic fluid into hydraulic fluid passages disposed within said injector body;
   a liquid fuel inlet port;
   a gaseous fuel inlet port; and
   at least one drain port for draining hydraulic fluid from said injector body;

(b) a liquid fuel injection valve that is maintainable in a closed position by a spring and that is openable to inject liquid fuel into said combustion chamber when liquid fuel pressure within said liquid fuel injection valve is sufficient to provide an opening force that overcomes a closing force applied by said spring, wherein hydraulic fluid pressure is employed to control said liquid fuel pressure;

(c) a first hydraulic actuator system for controlling said liquid fuel pressure within said liquid fuel injection valve, said first hydraulic actuator system comprising:
   a first hydraulic fluid chamber, wherein said liquid fuel pressure is controlled by controlling the hydraulic fluid pressure within said first hydraulic fluid chamber;
   a first hydraulic fluid passage fluidly connected to said first hydraulic fluid chamber, wherein a two-way valve is employed to control the flow of hydraulic fluid through said first hydraulic fluid passage; and
   a second hydraulic fluid passage fluidly connected to said first hydraulic fluid chamber, wherein an orifice is employed to control the flow of hydraulic fluid through said second hydraulic fluid passage wherein one of said first and second hydraulic fluid passages is fluidly connected to said at least one hydraulic fluid inlet port and the other one of said first and second hydraulic fluid passages is fluidly connected to said at least one hydraulic fluid drain port;

(d) a gaseous fuel injection valve for controlling the injection of said gaseous fuel through said gaseous fuel injection port and into said combustion chamber, said gaseous fuel injection valve being hydraulically actuated by a second hydraulic actuator system that is in fluid communication with at least one of said hydraulic fluid passages within said injector body; and (e) a seal preventing leakage of said gaseous fuel within said injector body.

25. The fuel injector of claim 24 further comprising a metering device for metering an amount of liquid fuel that is directed to said liquid fuel injection valve, wherein said metering device comprises a piston disposed within a cylinder and the hydraulic fluid pressure within said first hydraulic fluid chamber is applied to one side of said piston and the metered liquid fuel within a fuel chamber on the other side of the piston is compressed when said piston moves to reduce the volume of said fuel chamber.

26. The fuel injector of claim 24 wherein said gaseous fuel injection valve is operable between an open position and a closed position and is operable to one of said open and closed positions by elevating the hydraulic fluid pressure within a second hydraulic fluid chamber.

27. The fuel injector of claim 26 further comprising a second hydraulic actuator system for controlling the hydraulic fluid pressure within said second hydraulic fluid chamber, said second hydraulic actuator system comprising:
   a third hydraulic fluid passage fluidly connected to said second hydraulic fluid chamber, wherein a two-way valve is employed to control the flow of hydraulic fluid through said third hydraulic fluid passage; and
   a fourth hydraulic fluid passage fluidly connected to said second hydraulic fluid chamber, wherein an orifice is employed to control the flow of hydraulic fluid through said fourth hydraulic fluid passage;
   wherein one of said third and fourth hydraulic fluid passages is fluidly connected to said at least one hydraulic fluid inlet port and the other one of said third and fourth hydraulic fluid passages is fluidly connected to said at least one hydraulic fluid drain port.

28. The fuel injector of claim 27 wherein said second hydraulic actuator system fills said second hydraulic fluid chamber with high-pressure hydraulic fluid to provide a closing force to said gaseous fuel injection valve and when the hydraulic fluid is drained from said second hydraulic fluid chamber, the pressure of the gaseous fuel within the injector provides the opening force for said gaseous fuel injection valve.

29. The fuel injector of claim 27 wherein said second hydraulic actuator system fills said second hydraulic fluid chamber with high-pressure hydraulic fluid to provide an opening force to said gaseous fuel injection valve and when the hydraulic fluid is drained from said second hydraulic fluid chamber, a spring provides the closing force for said gaseous fuel injection valve.

* * * * *

UNITED STATES PATENT AND TRADEMARK OFFICE
CERTIFICATE OF CORRECTION

PATENT NO. : 6,336,598 B1  Page 1 of 1
DATED : January 8, 2002
INVENTOR(S) : Alain M. J. Touchette, Bradley D. Douville, S. Michael Baker, Lester L. Peters, Julius Perr, A. S. Ghuman and Donald J. Benson It is certified that error appears in the above-identified patent and that said Letters Patent is hereby corrected as shown below:

<u>Title page,</u>
Item [56], References Cited, please add:
-- 4,742,801   05/1988   Kelgard --
Please correct
"4,736,712   04/1988   Kelgard"
to read:
-- 4,736,712   04/1988   Savkar et al. --

Signed and Sealed this

Twentieth Day of August, 2002

Attest:

JAMES E. ROGAN
Attesting Officer    Director of the United States Patent and Trademark Office